United States Patent
Terry et al.

(10) Patent No.: US 9,203,566 B2
(45) Date of Patent: Dec. 1, 2015

(54) RETUNING GAPS AND SCHEDULING GAPS IN DISCONTINUOUS RECEPTION

(75) Inventors: Stephen E. Terry, Northport, NY (US); Ghyslain Pelletier, Laval (CA); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 346 days.

(21) Appl. No.: 13/115,539

(22) Filed: May 25, 2011

(65) Prior Publication Data

US 2011/0292854 A1    Dec. 1, 2011

Related U.S. Application Data

(60) Provisional application No. 61/347,997, filed on May 25, 2010, provisional application No. 61/348,510, filed on May 26, 2010, provisional application No. 61/356,359, filed on Jun. 18, 2010.

(51) Int. Cl.

| H04L 5/00 | (2006.01) |
|---|---|
| H04J 1/04 | (2006.01) |
| H04L 1/00 | (2006.01) |
| H04W 24/02 | (2009.01) |
| H04W 52/02 | (2009.01) |
| H04W 76/04 | (2009.01) |

(52) U.S. Cl.
CPC .............. *H04L 5/001* (2013.01); *H04L 5/0098* (2013.01); *H04J 1/045* (2013.01); *H04L 1/0025* (2013.01); *H04L 5/0046* (2013.01); *H04L 5/0058* (2013.01); *H04W 24/02* (2013.01); *H04W 52/0232* (2013.01); *H04W 76/048* (2013.01)

(58) Field of Classification Search
CPC .......... H04J 1/045; H04J 1/04; H04L 1/0025; H04L 1/0026; H04L 5/0046
USPC ......................................................... 370/311
See application file for complete search history.

(56) References Cited

U.S. PATENT DOCUMENTS

| 2005/0250510 | A1 | 11/2005 | Kaikkonen et al. | |
|---|---|---|---|---|
| 2009/0303951 | A1* | 12/2009 | Lunttila et al. | 370/329 |
| 2010/0015984 | A1* | 1/2010 | Kazmi | 455/437 |
| 2010/0118720 | A1 | 5/2010 | Gavreau et al. | |
| 2010/0323627 | A1* | 12/2010 | Alanara | 455/67.11 |
| 2011/0199908 | A1* | 8/2011 | Dalsgaard et al. | 370/241 |

FOREIGN PATENT DOCUMENTS

| WO | 2008/020236 | 2/2008 |
|---|---|---|
| WO | 2008/042225 | 4/2008 |

OTHER PUBLICATIONS

Ericsson et al., "Activation/Deactivation Timing," 3GPP TSG-RAN WG2 #70, R2-103161 (May 10-14, 2010).
Ericsson et al., "DRX with Carrier Aggregation in LTE-Advanced," 3GPP TSG-RAN WG2 #67bis, R2-095809 (Oct. 12-16, 2009).

(Continued)

*Primary Examiner* — Faruk Hamza
*Assistant Examiner* — Abu-Sayeed Haque
(74) *Attorney, Agent, or Firm* — Volpe and Koenig, P.C.

(57) ABSTRACT

A method for scheduling a time when a retuning gap occurs by a wireless transmit/receive unit includes detecting a retuning triggering event; determining a period of time when a retuning gap occurs, on a condition that the triggering event is detected; and performing radio frequency front end retuning during the retuning gap.

19 Claims, 9 Drawing Sheets

(56) References Cited

OTHER PUBLICATIONS

Ericsson, "DRX with Carrier Aggregation in LTE-Advanced," 3GPP TSG-RAN WG2 #66, R2-092959 (May 4-8, 2009).
Nokia Siemens Networks, "Timing and HARQ Feedback Errors with Activation/Deactivation," 3GPP TSG-RAN WG2 Meeting #69bis, R2-101986 (Apr. 12-16, 2010).
Third Generation Partnership Project, "Technical Specification Group Radio Access Network; Evolved Universal Terrestrial Radio Acccess (E-UTRA) and Evolved Universal Terrestrial Radio Access Network (E-UTRAN); Overall description; Stage 2 (Release 9)," 3GPP TS 36.300 V9.7.0 (Mar. 2011).
Third Generation Partnership Project, "Technical Specification Group Radio Access Network; Evolved Universal Terrestrial Radio Acccess (E-UTRA) and Evolved Universal Terrestrial Radio Access Network (E-UTRAN); Overall description; Stage 2 (Release 10)," 3GPP TS 36.300 V10.3.0 (Mar. 2011).
Third Generation Partnership Project, "Technical Specification Group Radio Access Network; Evolved Universal Terrestrial Radio Acccess (E-UTRA) and Evolved Universal Terrestrial Radio Access Network (E-UTRAN); Overall description; Stage 2 (Release 9)," 3GPP TS 36.300 V9.3.0 (Mar. 2010).
Third Generation Partnership Project, "Technical Specification Group Radio Access Network; Evolved Universal Terrestrial Radio Acccess (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.1.0 (Mar. 2011).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.2.0 (Mar. 2010).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.1.0 (Dec. 2009).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.9.0 (Jun. 2010).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.8.0 (Dec. 2009).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.6.0 (Mar. 2011).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.2.0 (Mar. 2010).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.13.0 (Mar. 2011).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.9.0 (Mar. 2010).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.1.0 (Mar. 2011).
Iwamura et al., "Carrier Aggregation Framework in 3GPP LTE-Advanced [WiMAX/LTE Update]," IEEE Communications Magazine, vol. 48, No. 8, (Aug. 2010).

Renesas Electronics Europe, "Requirements for carrier aggregation retuning and deactivated SCell measurements," 3 GPP TSG-RAN WG4 Meeting #58AH, R4-111963 (Feb. 21-25, 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.7.0 (Mar. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.3.0 (Mar. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.3.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA); Radio Resource Control (RCC); Protocol specification (Release 9)," 3GPP TS 36.311 V9.6.0 (Mar. 2011).
Third Generation Partnership Project, "Technical Specification Group Radio Access Network; Evolved Universal Terrestrial Radio Access (E-UTRA); Radio Resource Control (RCC); Protocol specification (Release 9)," 3GPP TS 36.311 V9.2.0 (Mar. 2010).
Third Generation Partnership Project, "Technical Specification Group Radio Access Network; Evolved Universal Terrestrial Radio Access (E-UTRA); Radio Resource Control (RCC); Protocol specification (Release 8)," 3GPP TS 36.311 V8.13.0 (Mar. 2011).
Third Generation Partnership Project, "Technical Specification Group Radio Access Network; Evolved Universal Terrestrial Radio Access (E-UTRA); Radio Resource Control (RCC); Protocol specification (Release 8)," 3GPP TS 36.311 V8.9.0 (Mar. 2010).
Third Generation Partnership Project, "Technical Specification Group Radio Access Network; Evolved Universal Terrestrial Radio Access (E-UTRA); Radio Resource Control (RCC); Protocol specification (Release 10)," 3GPP TS 36.311 V10.1.0 (Mar. 2011).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.8.0 (Dec. 2009).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.311 V9.6.0 (Mar. 2011).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.311 V9.2.0 (Mar. 2010).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.311 V8.13.0 (Mar. 2011).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.311 V8.9.0 (Mar. 2010).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.311 V10.1.0 (Mar. 2011).
Nokia et al., "Need for measurement gaps with carrier aggregation," 3GPP TSG-RAN WG4 Meeting #54, R4-100799, San Francisco, USA (Feb. 22-26, 2010).
Nokia et al., "Discussion on mobility evaluations for carrier aggregation," 3GPP TSG-RAN WG4 Meeting #54, R4-100800, San Francisco, USA (Feb. 22-26, 2010).

(56) References Cited

OTHER PUBLICATIONS

Nokia et al., "Need for measurement gaps with carrier aggregation," 3GPP TSG-RAN WG4 Ad hoc meeting #10-02, R4-101386, Dublin, Ireland (Apr. 12-16, 2010).

Nokia et al., "Discussion on mobility evaluations for carrier aggregation," 3GPP TSG-RAN WG4 Ad hoc meeting #10-02, R4-101387, Dublin, Ireland (Apr. 12-16, 2010).

Third Generation Partnership Project, "Technical Specification Group Radio Access Network; Evolved Universal Terrestrial Radio Access (E-UTRA); Requirements for support of radio resource management (Release 8)," 3GPP TS 36.133 V8.9.0 (Mar. 2010).

Third Generation Partnership Project, "Technical Specification Group Radio Access Network; Evolved Universal Terrestrial Radio Access (E-UTRA); Requirements for support of radio resource management (Release 8)," 3GPP TS 36.133 V8.13.0 (Apr. 2011).

Third Generation Parternership Project, "Technical Specification Group Radio Access Network; Evolved Universal Terrestrial Radio Access (E-UTRA); Requirements for support of radio resource management (Release 9)," 3GPP TS 36.133 V9.3.0 (Mar. 2010).

Third Generation Parternership Project, "Technical Specification Group Radio Access Network; Evolved Universal Terrestrial Radio Access (E-UTRA); Requirements for support of radio resource management (Release 9)," 3GPP TS 36.133 V9.7.0 (Apr. 2011).

Third Generation Parternership Project, "Technical Specification Group Radio Access Network; Evolved Universal Terrestrial Radio Access (E-UTRA); Requirements for support of radio resource management (Release 10)," 3GPP TS 36.133 V10.2.0 (Apr. 2011).

Ericsson, "[70#14] LTE: Removal of Activation/Deactivation from Rel-10?" 3GPP TSG-RAN WG2 #70bis, R2-103878 (Jun. 28-Jul. 2, 2010).

Nokia Corporation, "DRX and Carrier Aggregation," 3GPP TSG-RAN WG2 Meeting #70, R2-102886 (May 10-14, 2010).

* cited by examiner

| # | CA DEPLOYMENT SCENARIOS (F2>F1) DESCRIPTION | EXAMPLE |
|---|---|---|
| 1 | F1 AND F2 CELLS ARE CO-LOCATED AND OVERLAID, PROVIDING NEARLY THE SAME COVERAGE. BOTH LAYERS PROVIDE SUFFICIENT COVERAGE AND MOBILITY CAN BE SUPPORTED ON BOTH LAYERS. LIKLEY SCENARIO WHEN F1 AND F2 ARE OF THE SAME BAND, e.g., 2 GHz, 800MHz, ETC. IT IS EXPECTED THAT AGGREGATION IS POSSIBLE BETWEEN OVERLAID F1 AND F2 CELLS. | |
| 2 | F1 AND F2 CELLS ARE CO-LOCATED AND OVERLAID, BUT F2 HAS SMALLER COVERAGE DUE TO LARGER PATH LOSS. ONLY F1 PROVIDES SUFFICIENT COVERAGE AND F2 IS USED TO PROVIDE THROUGHPUT. MOBILITY IS PERFORMED BASED ON F1 COVERAGE. LIKELY SCENARIO WHEN F1 AND F2 ARE DIFFERENT BANDS, e.g., F1={800MHz, 2 GHz} AND F2={3.5 GHz}, ETC. IT IS EXPECTED THAT AGGREGATION IS POSSIBLE BETWEEN OVERLAID F1 AND F2 CELLS. | |
| 3 | F1 AND F2 CELLS ARE CO-LOCATED BUT F2 ANTENNAS ARE DIRECTED TO THE CELL BOUNDARIES OF F1 SO THAT CELL EDGE THROUGHPUT IS INCREASED. F2 PROVIDES SUFFICIENT COVERAGE BUT F2 POTENTIALLY HAS HOLES, e.g., DUE TO LARGE PATH LOSS. MOBILITY IS BASED ON F1 COVERAGE. LIKELY SCENARIO WHEN F1 AND F2 ARE OF DIFFERENT BANDS, e.g., F1={800 MHz, 2GHz} AND F2={3.5 GHz}, ETC. IT IS EXPECTED THAT F1 AND F2 CELLS OF THE SAME eNB CAN BE AGGREGATED WHERE COVERAGE OVERLAPS. | |

FIG. 2A

| # | DESCRIPTION | EXAMPLE |
|---|---|---|
| 4 | F1 PROVIDES MACRO COVERAGE AND ON F2 REMOTE RADIO HEADS (RRHs) ARE USED TO PROVIDE THROUGHPUT AT HOT SPOTS. MOBILITY IS PERFORMED BASED ON F1 COVERAGE. LIKELY SCENARIO WHEN F1 AND F2 ARE OF DIFFERENT BANDS, e.g., F1={800 MHz, 2 GHz} AND F2={3.5 GHz}, ETC. IT IS EXPECTED THAT F2 RRHs CELLS CAN BE AGGREGATED WITH THE UNDERLYING F1 MACRO CELLS. | |
| 5 | SIMILAR TO SCENARIO #2, BUT FREQUENCY SELECTIVE REPEATERS ARE DEPLOYED SO THAT COVERAGE IS EXTENDED FOR ONE OF THE CARRIER FREQUENCIES. IT IS EXPECTED THAT F1 AND F2 CELLS OF THE SAME eNB CAN BE AGGREGATED WHERE COVERAGE OVERLAPS. | |

CA DEPLOYMENT SCENARIOS (F2>F1)

FIG. 2B

RETUNING GAPS AND SCHEDULING GAPS IN DISCONTINUOUS RECEPTION

CROSS REFERENCE TO RELATED APPLICATIONS

This application claims the benefit of U.S. Provisional Application No. 61/347,997, filed on May 25, 2010; U.S. Provisional Application No. 61/348,510, filed on May 26, 2010; and U.S. Provisional Application No. 61/356,359, filed on Jun. 18, 2010, the contents of which are hereby incorporated by reference herein.

BACKGROUND

The Third Generation Partnership Project (3GPP) Long Term Evolution (LTE) Release 8 and 9 discontinuous reception (DRX) procedures determine the period of physical downlink control channel (PDCCH) reception. PDCCH reception and the configured semi-persistent scheduling determine when a physical downlink shared channel (PD-SCH) on a downlink (DL) component carrier (CC) and a physical uplink shared channel (PUSCH) transmission on an uplink (UL) CC may occur.

In LTE Release 8/9 (also applicable to LTE Release 10), the network may configure a WTRU with parameters for discontinuous reception (DRX). DRX is a functionality that allows a WTRU to not monitor or decode the PDCCH, for the purpose of lowering WTRU power consumption. The DRX functionality relies on a specific set of rules based on PDCCH activity for a number of specific RNTIs. These rules ensure that the network and the WTRU are properly synchronized with respect to when the WTRU can be reached using the control signaling.

LTE-Advanced (LTE Release 10) is an evolution that aims to improve LTE Release 8/9's data rates using, among other methods, bandwidth extensions also referred to as carrier aggregation (CA). With CA, the WTRU may transmit and receive simultaneously over the PUSCH and the PDSCH (respectively) of multiple Component Carriers (CCs). Up to five CCs in the UL and in the DL may be used, thus supporting flexible bandwidth assignments up to 100 MHz.

SUMMARY

A method for scheduling a time when a retuning gap occurs by a wireless transmit/receive unit includes detecting a retuning triggering event; determining a period of time when a retuning gap occurs, on a condition that the triggering event is detected; and performing radio frequency front end retuning during the retuning gap.

BRIEF DESCRIPTION OF THE DRAWINGS

A more detailed understanding may be had from the following description, given by way of example in conjunction with the accompanying drawings, wherein:

FIGS. 2A-2B show several example carrier aggregation deployment scenarios;

DETAILED DESCRIPTION

Figure 1A:
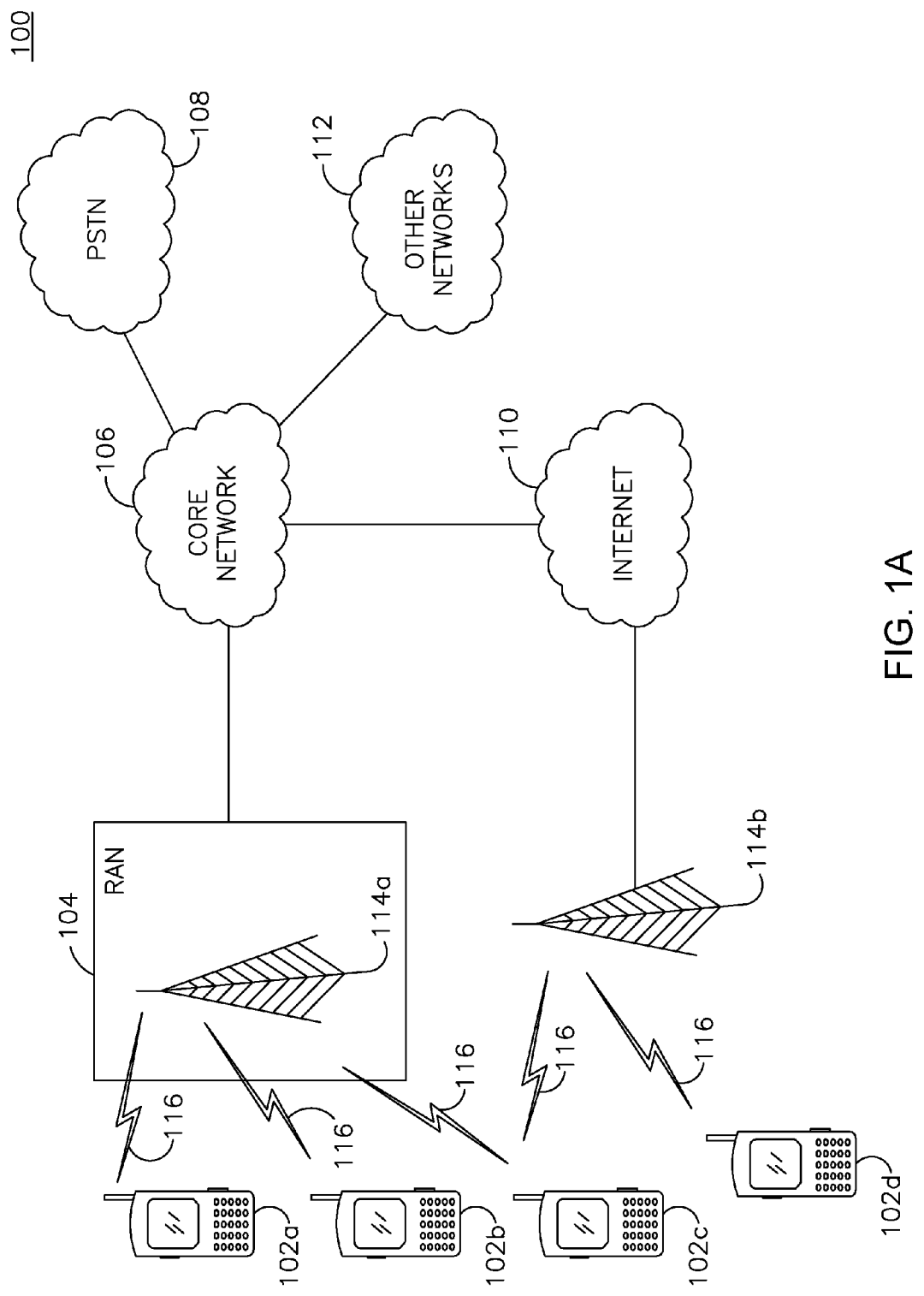
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
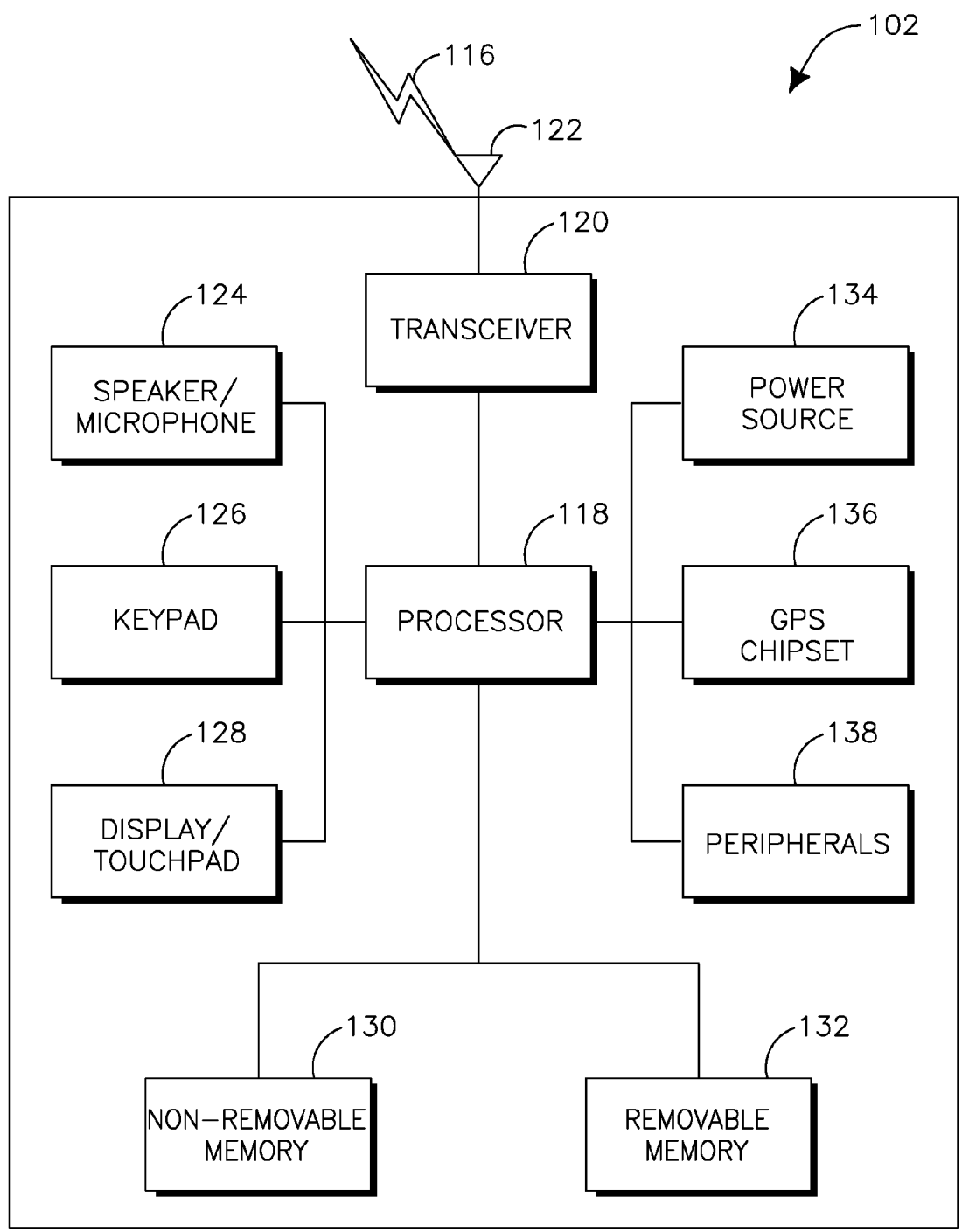
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
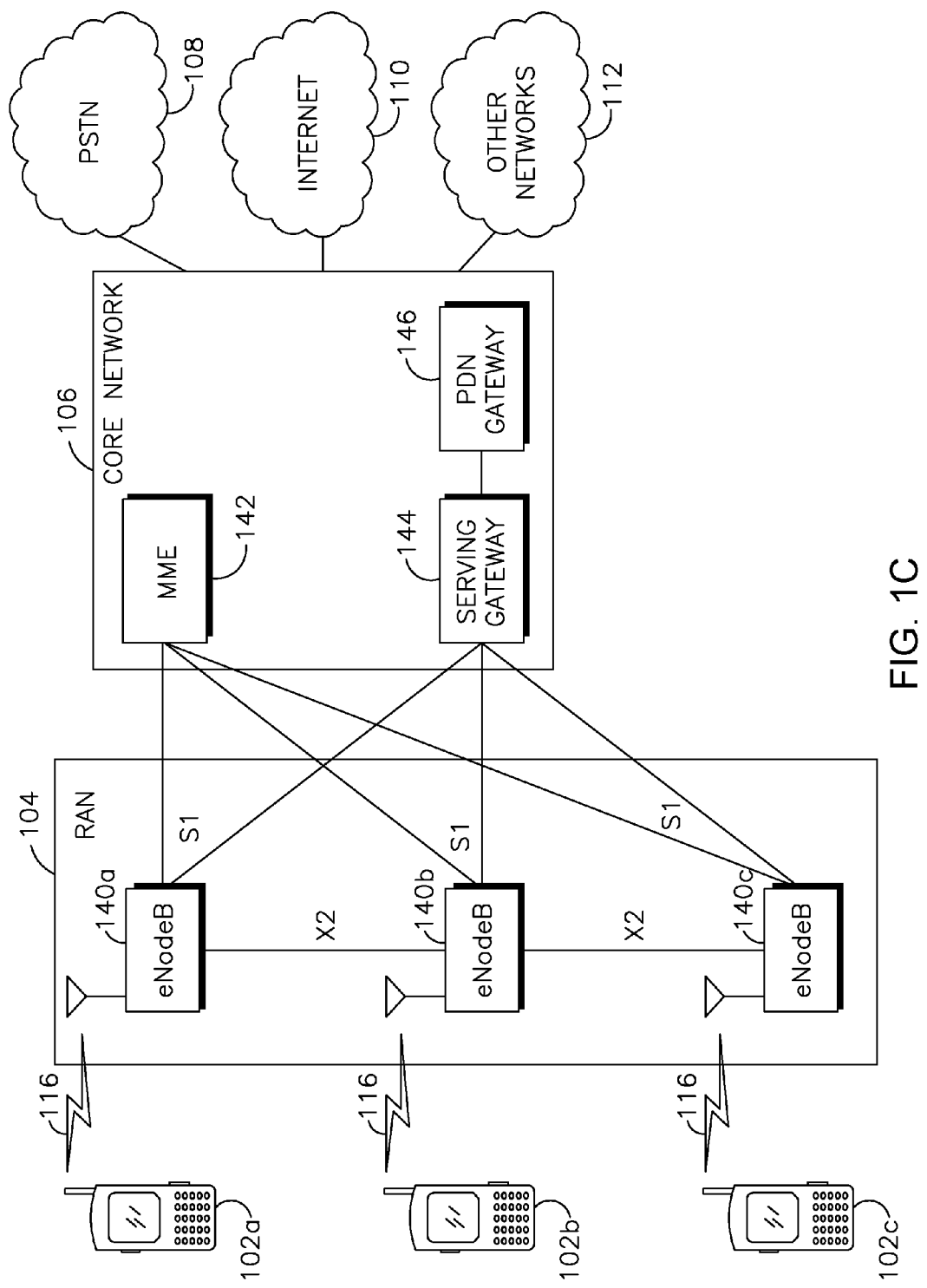
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

The wireless transmit/receive unit (WTRU) may be configured by radio resource control (RRC) signaling with a discontinuous reception (DRX) functionality that controls the WTRU's PDCCH monitoring activity for the WTRU's cell radio network temporary identifier (C-RNTI), the RNTI used for sending transmit power control (TPC) commands applicable to the physical uplink control channel (TPC-PUCCH-RNTI), the RNTI used for sending TPC commands applicable to the PUSCH (TPC-PUSCH-RNTI), and the semi-persistent scheduling C-RNTI (if configured).

The PDCCH is conceptually separated into two distinct regions. The set of CCE locations in which a WTRU may find DCIs it should act on is referred to as a Search Space (SS). The SS is conceptually split into the common SS (CSS) and WTRU-specific SS (UESS). The CSS is common to all WTRUs monitoring a given PDCCH, while the UESS differs from one WTRU to another. Both SS may overlap for a given WTRU in a given sub-frame, as this is a function of the randomization function, and this overlap differs from one sub-frame to another.

Depending on the WTRU's connection to the network, capabilities, and supported features, the WTRU monitors one or more of the following RNTIs for grants, assignments, and other control information from the eNB.

The System Information RNTI (SI-RNTI) is cell-specific, and is used to indicate scheduling of system information on the PDSCH, in the CSS.

The Paging RNTI (P-RNTI) may be assigned to multiple WTRUs, for decoding of the paging notification (mainly in IDLE mode), in the CSS.

The Random Access RNTI (RA-RNTI) is used to indicate scheduling of the Random Access Response on the PDSCH, and unambiguously identifies which time-frequency resource was used by a WTRU to transmit the random access preamble.

The multimedia broadcast and multicast service (MBMS) RNTI (M-RNTI) is cell-specific and is used to decode the notification of a change on the MBMS control channel (MCCH) in the CSS.

The Cell RNTI (hereafter C-RNTI) is a WTRU-specific RNTI, used to decode the PDCCH for contention-free grants and assignments; typically for DCIs in the UESS.

The Temporary C-RNTI is typically used for decoding of message 4 for the contention-based procedure, and/or before the WTRU gets assigned its own C-RNTI.

The Semi-Persistent scheduling C-RNTI (SPS-C-RNTI) is typically used to activate a semi-persistent DL allocation on the PDSCH or UL grant on the PUSCH, in the UESS.

When the WTRU is in RRC CONNECTED mode and if DRX is configured, the WTRU may monitor the PDCCH discontinuously using DRX operation; otherwise, the WTRU monitors the PDCCH continuously. When using DRX operation, the WTRU may also monitor the PDCCH according to other requirements. RRC controls the DRX operation by configuring several timers, including: onDurationTimer, drx-InactivityTimer, drx-RetransmissionTimer (one per DL hybrid automatic repeat request (HARQ) process, except for the broadcast process), the longDRX-cycle, the value of the drxStartOffset timer, and optionally the drxShortCycleTimer and shortDRX-cycle. A HARQ round trip time (RTT) timer per DL HARQ process (except for the broadcast process) is also defined.

When a DRX cycle is configured, the Active Time includes the time while: the on DurationTimer, drx-InactivityTimer, drx-RetransmissionTimer, or mac-ContentionResolutionTimer is running; a scheduling request is sent on the PUCCH and is pending; a UL grant for a pending HARQ retransmission may occur and there is data in the corresponding HARQ buffer; or a PDCCH indicating a new transmission addressed to the C-RNTI of the WTRU has not been received after successful reception of a Random Access Response for the preamble not selected by the WTRU.

During the Active Time period, for a PDCCH subframe, if the subframe is not required for UL transmission for half-duplex frequency division duplex (FDD) WTRU operation and if the subframe is not part of a configured measurement gap, then the WTRU may monitor the PDCCH. If the monitored PDCCH indicates a DL transmission or if a DL assignment has been configured for the current subframe, then the WTRU may start the HARQ RTT Timer for the corresponding HARQ process and stop the drx-RetransmissionTimer for the corresponding HARQ process. If the monitored PDCCH indicates a new transmission (either DL or UL), then the WTRU may start or restart drx-InactivityTimer.

In 3GPP LTE Release 10, a WTRU may be connected to one or more UL and/or one or more DL CCs, via carrier aggregation. When transmission is enabled and/or disabled on any component carrier, the WTRU may retune the radio frequency (RF) front end to minimize required processing and battery consumption. In general, component carriers may be enabled and disabled depending on traffic requirements and radio conditions. This may either be accomplished by explicit activation or deactivation signaling, independent DRX procedures, or some combination of both procedures. Explicit activation or deactivation signaling from the enhanced Node B (eNB) to the WTRU may be applied and may include Layer 1 (PDCCH) signaling, Layer 2 (MAC control element (CE)) signaling, or Layer 3 (RRC) signaling.

The Release 8/9 DRX procedures may also be applied in this situation. The DRX state may be independently determined for each CC or different subsets of CCs according to existing or similar Release 8/9 procedures. The DRX state of one CC or a subset of CCs is mutually exclusive of other configured CCs. The DRX state may be common across all configured CCs, such that events on any one CC affects the DRX state of all CCs. If independent DRX is applied, the same RF front end retuning as for explicit activation or deactivation may be applied whenever a CC or subset of CCs enters or leaves DRX, to reduce processing and power requirements.

To enable reasonable WTRU battery consumption when carrier aggregation (CA) is configured, a DL activation or deactivation mechanism of secondary cells (SCells) is supported (i.e., the activation or deactivation does not apply to a primary cell (PCell)). When an SCell is deactivated, the WTRU does not need to receive the corresponding PDCCH or PDSCH, nor is it required to perform CQI measurements. Conversely, when an SCell is active, the WTRU may receive the PDSCH and the PDCCH (if the WTRU is configured to monitor PDCCH from this SCell), and is expected to be able to perform CQI measurements. But in the UL, a WTRU is to be able to transmit on the PUSCH on any SCells when scheduled on the corresponding PDCCH (i.e., there is no explicit activation of SCells in the UL).

The activation or deactivation mechanism is based on the combination of a MAC CE and deactivation timers. The MAC CE carries a bitmap for the DL activation and deactivation of SCells: a bit set to 1 denotes activation of the corresponding SCell, while a bit set to 0 denotes deactivation of the corresponding SCell. With the bitmap, SCells may be activated and deactivated individually, and a single activation or deactivation command may activate or deactivate a subset of the SCells. One deactivation timer is maintained per SCell, but one common value is configured per WTRU by RRC.

Because variable data rate services are supported, transmission and reception on CCs will need to be frequently enabled and disabled, for optimal performance and considering the motivation to minimize WTRU processing and battery life.

FIG. 2 shows some of the potential deployment scenarios for CA. In Release 10, for the UL, the focus is on supporting intra-band carrier aggregations (e.g., scenario #1, as well as scenarios #2 and #3 when F1 and F2 are in the same band). For the DL, all of the scenarios shown in FIG. 2 may be supported in Release 10.

In LTE Release 8/9, the PDCCH is used by the network (e.g., the eNB) to assign PDSCH resources for DL transmissions and to grant PUSCH resources for UL transmissions to the terminal device (hereafter WTRU). The WTRU may request radio resources for a UL transmission by sending a scheduling request (SR) to the eNB. The SR may be transmitted either on dedicated resources (D-SR) on the PUCCH if configured, or otherwise using the Random Access procedure (RA-SR). The WTRU is granted radio resources by the eNB for a transmission on the PUSCH, indicated either in a grant received on the PDCCH in configured resources (a semi-persistently scheduled UL grant).

In LTE Release 8/9, which is a single carrier system where the network assigns the WTRU only one pair of UL and DL carriers, for any given subframe, there is a single HARQ process active for the UL and a single HARQ process active in the DL.

For LTE Release 8/9, multiple control information messages (i.e., DCIs) may be received by a WTRU on the PDCCH in each sub-frame, according to the following: if any, there is at most one UL grant and one DL assignment with C-RNTI/SPS-C-RNTI; and if any, there is at most one message with P-RNTI (paging) and one message with SI-RNTI (SI change notification) in the CSS.

The benefit of DRX thus goes beyond saving some processing for the PDCCH. For subframes in which the WTRU is not required to monitor the PDCCH for UL grants and DL assignments, a WTRU implementation may elect to turn off at least parts of its transceiver circuitry, possibly including memory components and/or parts of the baseband component (if the number of subframes for which the WTRU will not monitor the PDCCH is sufficiently large, e.g., a few 10 s of milliseconds).

Figure 3:
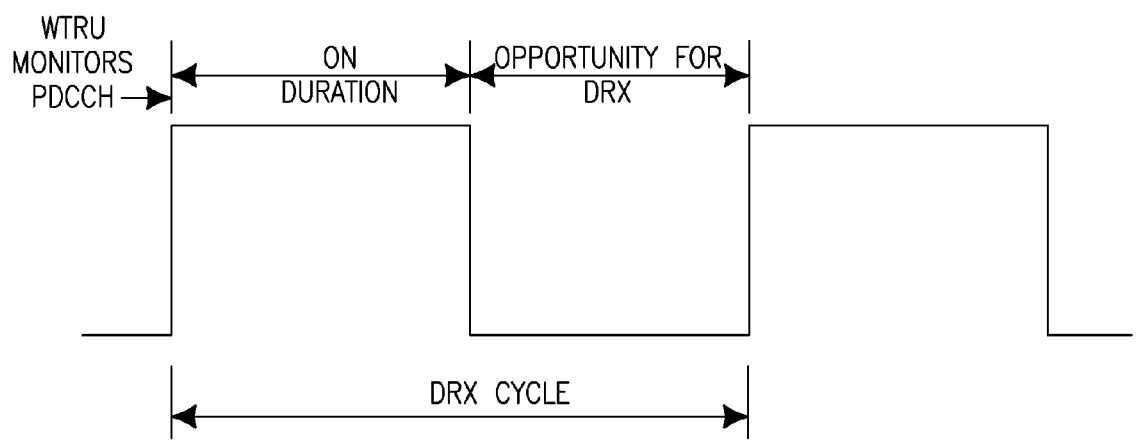
FIG. 3 is a timing diagram showing an example DRX cycle.

An example DRX cycle is shown in FIG. 3. In LTE Release 8/9, the WTRU typically initiates the random access (RA) procedure when one of the following events occurs. When the WTRU makes an initial access to the network, to establish an RRC connection. When the WTRU accesses the target cell during a handover procedure. When the WTRU performs the RRC Connection Re-establishment procedure. When the WTRU is instructed by the network to perform the RA procedure (i.e., by a PDCCH RA order, typically for DL data arrival). When the WTRU makes a scheduling request, but has no dedicated resources on the PUCCH for the request, typically when the WTRU has new UL data to transmit, which data is of higher priority than existing data in its buffer.

Depending on whether or not the WTRU is assigned dedicated RACH resources (e.g., a specific preamble and/or PRACH resource), the RA procedure may be either contention-free (CFRA) or contention-based (CBRA), and includes the following steps. First, the preamble is transmitted on a resource of the PRACH. Second, the Random Access Response (RAR) is received, the RAR including a grant for a UL transmission and a Timing Advance Command (TAC).

Two additional steps are performed for CBRA. Third is transmission of a Layer 2/Layer 3 (i.e., the actual RA procedure) message. Fourth, contention resolution is performed, in which the WTRU determines whether or not it successfully completed the RACH procedure based on either the C-RNTI on the PDCCH or the WTRU Contention Resolution Identity on the DL-SCH.

In LTE Release 8/9, the WTRU may be configured using RRC, with dedicated resources for the transmission of CQI, PMI, or RI reports and for scheduling requests (D-SR). In addition, a WTRU may be configured with dedicated UL resources for SPS, i.e., it may be configured with a PUSCH resource for UL SPS, as well as with a UL PUCCH resource for HARQ acknowledgement (ACK)/negative acknowledgement (NACK) (A/N) for a corresponding DL SPS configuration. The network may also assign a WTRU with dedicated SRS resources to assist scheduling decisions in allocating UL resources for PUSCH transmissions.

In LTE Release 8/9, before a WTRU performs UL transmissions for periodic SRS or a UL transmission on either the PUCCH (i.e., HARQ A/N feedback; SR; periodic CQI, PMI, or RI reports) or the PUSCH, the WTRU needs proper timing alignment with the network. UL synchronization is initially achieved using the RACH procedure, and the network subsequently transmits TACs in the DL to maintain proper timing alignment. A TAC may be received in the RAR during the RA procedure or in a Timing Advance MAC CE.

After receiving a TAC, the WTRU restarts the TA timer (TAT). When the TAT is running, the WTRU may transmit on a PUCCH resource in a subframe for which the WTRU does not perform a PUSCH transmission (single carrier property). PUCCH resources are dynamically allocated for HARQ A/N feedback for a PDSCH transmission in a frequency or time shared resource of the PUCCH region. The WTRU determines which PUCCH resource to use based on the first CCE of the DCI received on the PDCCH which indicated the PDSCH assignment.

The TAT may expire for a synchronized WTRU when it does not receive a TAC from the network for at least period equal to the configured value of the TAT (i.e., the timeAlignmentTimer, which ranges from 500 ms up to 10240 ms, if enabled). A WTRU may not receive a TAC in case all TACs are lost during that period, i.e., following the consecutive loss of multiple TACs, which is a rare error case that may be minimized by a scheduler implementation using sufficient repetitions. Alternatively, a WTRU may not receive a TAC if the network does not send any TACs, for the purpose of implicitly releasing dedicated UL resources when the network no longer schedules the WTRU for new transmissions. The validity of the WTRU's timing advance is entirely controlled by the eNB.

When the TAT expires, the WTRU releases its dedicated UL resources, including any configured SRS resources, as well as PUCCH resources for D-SR, CQI/PMI/RI; and any configured DL and UL SPS resources.

Additionally, the WTRU may not perform any PUCCH or PUSCH transmission once it is not considered synchronized with the network. One reason to avoid UL transmission from WTRUs which may no longer be synchronized is to avoid possible interference to the transmission of other WTRUs. In addition, avoiding the UL transmission provides an implicit means for the scheduler to revoke dedicated UL resources, simply by having the TAT expiring following the absence of TACs from the network.

The control information for scheduling the PDSCH and the PUSCH may be sent on one or more PDCCH(s). In addition to the LTE Release 8/9 scheduling using one PDCCH for a pair of UL and DL carriers, cross-carrier scheduling may also be supported for a given PDCCH, allowing the network to provide PDSCH assignments and/or PUSCH grants for transmissions in other CC(s).

For a LTE Release 10 WTRU operating with CA, there is one HARQ entity for each CC, each HARQ entity having eight HARQ processes, i.e., one per subframe for one RTT. There may be more than one HARQ process active for the UL and for the DL in any given subframe, but there is at most one UL and one DL HARQ process per CC.

When referred to hereafter, the term "primary component carrier (PCC)" includes, without loss of generality, a carrier of a WTRU configured to operate with multiple component carriers for which some functionality, e.g., derivation of security parameters and non-access stratum (NAS) information, may be applicable only to that component carrier. The WTRU may be configured with at least one PCC for the DL (DL PCC) and one for the UL (UL PCC). Consequently, a carrier which is not a PCC of the WTRU is hereafter referred to as a secondary component carrier (SCC).

The DL PCC may, for example, correspond to the CC used by the WTRU to derive initial security parameters when initially accessing the system. The UL PCC may, for example, correspond to the CC whose PUCCH resources are configured to carry all HARQ A/N and channel state information (CSI) feedback for a given WTRU.

A cell of a WTRU typically includes a DL CC and, optionally, is combined with a set of UL resources, e.g., a UL CC. For LTE Release 10, the primary cell (PCell) includes a combination of a DL PCC and a UL PCC. A secondary cell (SCell) of the WTRU's multicarrier configuration includes a DL SCC and optionally a UL SCC (i.e., asymmetric configurations, where a WTRU is configured with more DL CCs than UL CCs, are supported in LTE Release 10). For LTE Release 10, the WTRU's multicarrier configuration includes one PCell and up to five SCells.

With CA, the WTRU may concurrently use multiple receiver chains in the RF front end. Support for non-contiguous spectrum also implies that the RF front end has to be capable of suppressing blocking signals between the different spectrum parts.

One aspect of CA relevant to DRX is the distribution of the WTRU power consumption between different components of a transceiver and their respective startup times. Another aspect is the number of configured SCells for a WTRU, their impact on power consumption, and the impact of a reconfiguration of the RF front end. The activation and/or deactivation of one or more CC(s) may require a change in the bandwidth and the sampling rate used in the RF front end, leading to a period (which may range between hundreds of microseconds up to 2 ms) during which transmission to and from the WTRU may not be possible.

As referred to herein, "activation" of a CC (and in particular of a SCC) typically includes the process whereby a WTRU ensures that its transceiver(s) can perform reception on the relevant DL CC and/or perform transmission on the relevant UL CCs for a PCell and possibly also one or more SCell(s) of its multicarrier configuration. This may include a reconfiguration of the RF front end as explained above in case of a transition from a state which is not an "active" state. Similarly, "deactivation" of a CC refers to a state where the CC is not "active," whereby a transition from this state may also have similar implications.

In terms of implementation and power consumption, as well as requirements when performing respective state transitions, there may be a difference between a change of DRX state and a change in activation state for a given CC.

For a WTRU configured to operate with multiple CCs, PDCCH monitoring and/or PDSCH reception for a PCC is typically activated and may be governed by DRX. PDCCH monitoring and/or PDSCH reception for a configured SCC may be either activated or deactivated, and may additionally be governed by DRX when activated.

When the WTRU is operating with multiple CCs, cross-carrier scheduling, i.e., scheduling across carriers using PDCCH, may be supported. When cross-carrier scheduling is possible, monitoring of the PDCCH may not be necessary in all configured and/or active carriers.

When considering WTRU power savings with multicarrier operation, there are a number of different alternatives. In a common DRX (baseline) alternative, the WTRU monitors the PDCCH for all CCs (configured with the PDCCH) in a subframe that is part of the DRX Active Time, which is the same for all CCs. In an independent DRX alternative, all DRX timers are per CC and consequently the WTRU monitors the PDCCH per CC (configured with the PDCCH) independently. In a fast activation or deactivation mechanism, SCells may be activated and deactivated individually by either L1 (e.g., using PDDCH) or L2 (e.g., using MAC CE) signaling, and a single activation or deactivation command may activate or deactivate a subset of the serving cells. This fast activation or deactivation mechanism may be used by itself or combined with the common DRX or independent DRX alternatives.

If the WTRU is designed with a single RF front end, whenever transmission or reception of a CC is enabled or disabled, retuning of RF reception and transmission may affect transmission on other CCs which are not included in the enabling or disabling. To minimize the WTRU transmission and reception processing requirements, UL and DL CCs should be enabled only when necessary, to eliminate or minimize transmission and reception failures.

For a WTRU supporting multicarrier operation, i.e., for which more than one CC may be configured in a LTE Release 10 system with CA, how to maximize WTRU power consumption while addressing the possible need to perform RF retuning for activation or deactivation of at least one CC is considered. In conjunction with a DRX mechanism, handling of a reconfiguration of the RF front end (e.g., to allow for CC activation and deactivation) is considered, during which time it may not be possible for the network to schedule a WTRU. Handling of the DRX Active Time for each of the activated CCs, i.e., the subframes for which a WTRU may be addressed by a network scheduler for a transmission is also considered, given that turning on or off (e.g., DRX) and/or (de)activation (e.g., possibly requiring a reconfiguration of the RF front end) of a SCC would both be made possible to a WTRU implementation.

The WTRU and the network must have a coherent and synchronized view of which CC(s) and for which subframe(s) the WTRU monitors the control signaling (e.g., the PDCCH). One issue is which events govern the DRX Active Time for each CC, and whether or not it is possible for the WTRU to perform a retuning of the RF front end.

A WTRU may detect some scheduling activity during a given period to determine whether or not it may activate an additional SCC, or deactivate a currently active SCC. The scheduling activity may implicitly or explicitly indicate which subframe(s) may be used to perform the necessary adjustments and during which the WTRU is not expected to receive control signaling for impacted CCs.

It is desirable to ensure that the WTRU and the network remain synchronized with respect to UL timing and HARQ state. This synchronization includes handling of timing alignment upon reconfiguration of the RF front end (e.g., performed for the purpose of (de)activating a CC), which reconfiguration may introduce a drift larger than what is required for a WTRU to still be considered to have proper UL timing alignment. The synchronization also includes handling of the HARQ state during a scheduling gap, i.e., during the time for which it may not be possible for the network to schedule a WTRU.

The WTRU may determine whether or not it must obtain proper UL synchronization, upon RF retuning. The WTRU may determine the proper HARQ state in a given subframe in which there is at least one active HARQ process while the WTRU cannot receive (e.g., PDCCH, PHICH) or transmit (e.g., PUCCH) control signaling for the HARQ process(es).

Retuning transmission or reception failures may be minimized or eliminated by delaying enabling and/or disabling of CCs until a transmission or reception idle period can be predicted by the WTRU or coordinated with the eNB. The enabling and/or disabling of CCs is determined by either explicit or implicit means, so that a known time period, referred to as a retuning gap, is coordinated between the WTRU and eNB.

In general, for each of the proposed methods, following a CC enabling and/or disabling triggering event, the WTRU determines an earliest retuning gap opportunity that minimizes, and in some cases may eliminate transmission or reception failures on other CCs not effected by the enabling and/or disabling. Optimally, the WTRU-determined retuning gap is known to the eNB, so that the eNB may take further actions to eliminate transmission or reception failures.

WTRU autonomous determination of retuning gap opportunities may be initiated from explicit signaling received from the eNB or implicit based triggering events detected by the WTRU. The eNB may send explicit signaling, requesting activation and/or deactivation of one or more CCs. The eNB signaling may be a PHY PDCCH command, a MAC control element, or a RRC configuration message requesting the enabling and/or disabling of one or more CCs. Upon receiving the eNB request, the WTRU determines the next retuning gap opportunity according to one of several methods, described below.

Activation or deactivation may be implicitly triggered by the DRX state of one or more configured CCs. If each configured CC or subset of configured CCs has a mutually exclusive independent DRX state relative to other CCs, the change in DRX state of any one CC or subset of CCs results in initiating WTRU autonomous determination of the next retuning gap opportunity. If all configured CCs have a common DRX state, the change in the common DRX state may also result in determining the next retuning gap opportunity.

During the WTRU active transmission or reception state on any configured CC, the WTRU may delay enabling and/or disabling of any CC until an inactive transmission or reception state is determined on all configured CCs that would allow for the retuning period. Alternatively, the WTRU may track individual UL and DL transmissions and retransmissions on all enabled CCs, to determine when retuning gaps exist, which minimize and potentially eliminate failed transmission or reception during the retuning period.

The eNB may also consider knowledge of WTRU autonomous method(s) for determining retuning gaps and when CC activations and/or deactivations have been triggered, to avoid initiating new transmissions and retransmissions during the known retuning gap periods.

If either explicit signaling and/or an implicit event triggers the need to enable or disable one or more CCs, the enabling or disabling of CC transmission or reception is performed at the next retuning gap.

More than one enabling and/or disabling triggering event may occur before the WTRU determined retuning gap occurs. When multiple triggering events occur, the events are additive, except that the later received events take precedence. If different subsets of CCs experience triggering events, the combined super set is affected when the retuning gap occurs. It is also possible that some or all triggered CC triggering events are cleared. For example, a triggering event may be cleared if an enabled CC has a disabling event and a subsequent enabling event. If all detected triggering events are cleared by subsequent triggering events, the WTRU determined retuning gap is canceled and normal transmission and reception may continue over the previously scheduled retuning gap period.

Transmissions not directly associated with PUSCH and PDSCH transmission may also be considered when the WTRU determines the next available retuning gap. For example, the following cases may additionally exclude WTRU determined retuning gap opportunities: any PUCCH transmission (i.e., for periodic CQI, PMI, or RI); any periodic or aperiodic requested SRS transmission; an ongoing RACH procedure, as long as MSG1-4 is not interrupted; a paging occasion; or system information reception.

Transmissions and retransmissions are known to the WTRU, and the WTRU may make an autonomous retuning gap determination based on this knowledge. New UL transmissions are known in advance, based on PDCCH reception four transmission time intervals (TTIs) in advance. UL retransmissions are also known in advance, by HARQ feedback or PDCCH scheduling four TTIs in advance. DL retransmissions may also be approximated from WTRU generated feedback at least eight TTIs in advance of the earliest retransmission of that HARQ process.

In these cases, the WTRU may determine when an idle period may occur, to apply the retuning procedure for activation and/or deactivation of any subset of available CCs to avoid interrupting ongoing transmissions. The WTRU may track transmission and retransmission opportunities on all configured UL and DL CCs. The WTRU determines the retuning gap when a common idle period greater than or equal to the required retuning period duration is found across all CCs.

Figure 4:
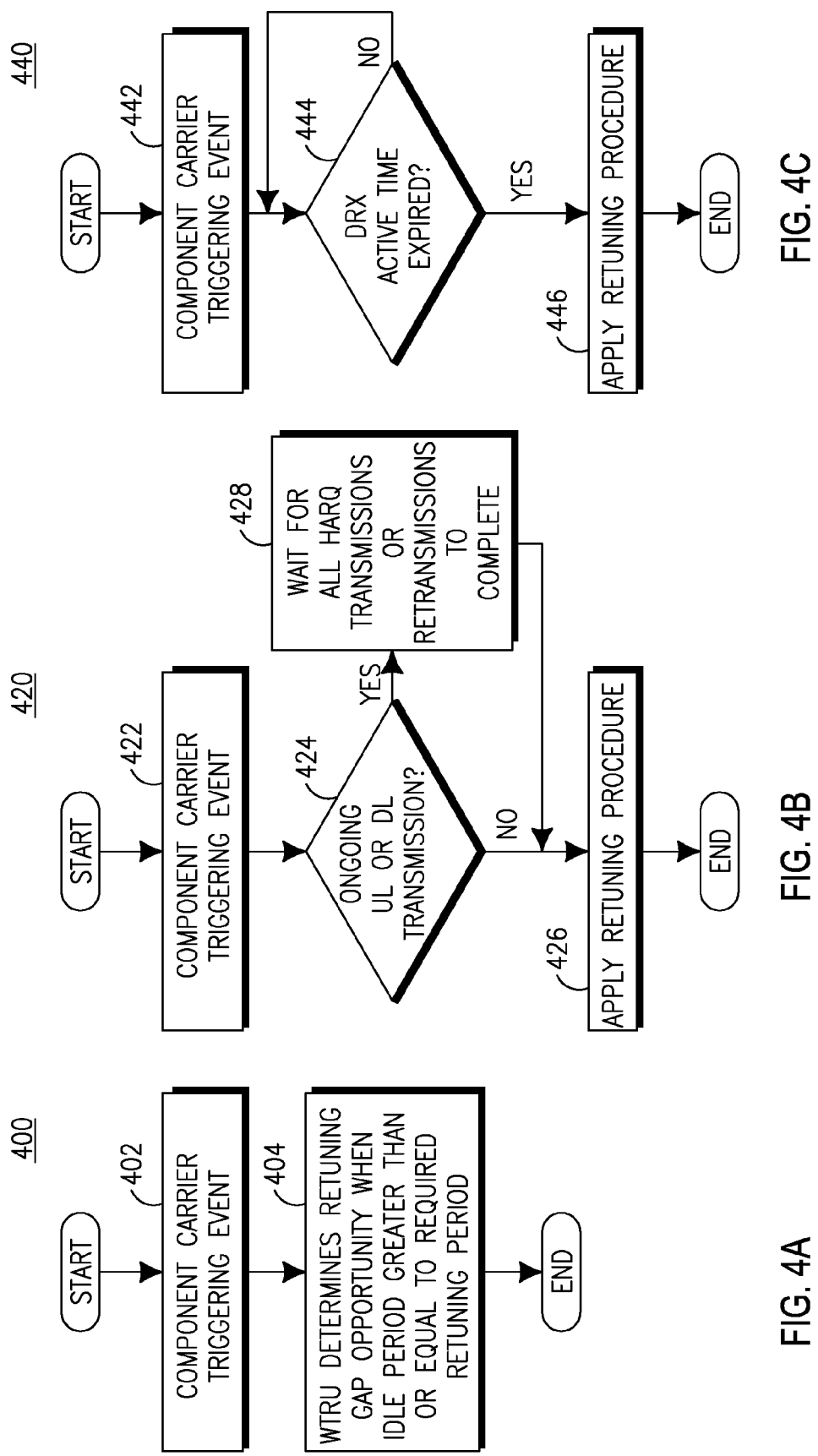
FIGS. 4A-4C are flowcharts of methods for WTRU-based retuning gap determination.

FIG. 4A is a flowchart of a method 400 for the WTRU determining the retuning gap opportunity. A CC triggering event occurs (step 402) and the WTRU determines the retuning gap opportunity when it detects an idle period that is at least as long as the required retuning period (step 404).

The WTRU initiates the retuning gap determination procedure following a CC enabling and/or disabling event. This event may result from explicit signaling received from the eNB and/or based on internal WTRU procedures (i.e., independent DRX) also resulting in enabling or disabling one or more CCs. If per-CC or subset of CCs independent DRX procedures are applied, by aligning the start of the DRX On Durations, it is occasionally possible to avoid an enabling delay when no CC is currently enabled.

It is currently not possible for the WTRU to predict when new DL transmissions may be initiated by the eNB. But the eNB would be aware of the CC enabling and/or disabling triggering event and the WTRU logic for determining the next available retuning gap. The eNB may use this knowledge to avoid scheduling new DL transmission opportunities during the WTRU determined retuning gap when the retuning procedure is applied.

One method that may be used in conjunction with this WTRU autonomous retuning gap determination method is for the eNB to control or force when the gap will be determined, so that the eNB may determine in advance when new initiated transmissions should be avoided. Based on knowledge of the WTRU retuning gap determination procedure, the eNB may idle one or more consecutive HARQ processes, so that the WTRU retuning gap may be predicted by the eNB in advance.

Another approach, that does not require as fast WTRU processing, is to wait for any ongoing UL and DL HARQ process transmissions and retransmissions on all CCs to be completed. The WTRU may make an autonomous retuning gap determination following the HARQ process transmission cycle. If a CC enabling or disabling triggering event occurs and there is no ongoing UL and/or DL transmission, then the retuning procedure may be immediately applied. If there are ongoing transmissions, then the WTRU waits for all UL and DL HARQ process transmissions and retransmissions to conclude to determine the retuning gap and apply the retuning procedure.

FIG. 4B is a flowchart of a method 420 for performing retuning after active HARQ processes have completed. A CC triggering event occurs (step 422) and a determination is made whether there are any ongoing UL or DL transmissions (step 424). If there are no ongoing UL or DL transmissions, then the WTRU applies the retuning procedure (step 426). If there are ongoing UL or DL transmissions, then the WTRU waits for all HARQ transmissions or retransmissions to complete (step 428), and then applies the retuning procedure (step 426).

The WTRU retuning gap for enabling or disabling of CCs may be autonomously determined by the WTRU when all ongoing HARQ process transmissions have completed on both the UL and the DL directions. For UL transmissions, the criteria for determining the retuning gap is satisfied when all ongoing UL HARQ process transmissions on all UL CCs have either received a positive ACK or the maximum number of HARQ retransmissions has been exceeded for each HARQ process.

For DL transmissions, the criteria for determining the retuning gap is satisfied when all ongoing DL HARQ processes have generated a positive ACK. DL transmission criteria may also be satisfied if a maximum number of HARQ process retransmissions are known to the WTRU, or there is no initiated DL retransmission following a known time period. When both UL and DL retuning gap criteria are satisfied, the retuning procedure is applied. HARQ process transmission and/or reception may then resume immediately following the retuning gap, as long as DRX criteria allows for reception at that point (for example, if the DRX On Duration, Inactivity, or Retransmission timers are still active).

Additionally, an idle time where no new UL and/or DL transmissions are initiated may be taken into account from the end of the last prior active transmission or retransmission before applying the retuning procedure. The idle period allows the eNB to halt initiation of any new transmissions and have the WTRU reliably coordinate the retuning period, so that new initiated transmissions are not interrupted. Because the CC enabling and/or disabling event is known to the eNB and the new initiated transmission may be halted by the eNB, this idle period may be shorter than the existing DRX inactivity and retransmission timers. Once the retuning procedure is completed, for example in one or two TTIs, normal transmission and reception is resumed depending on DRX criteria (i.e., if the inactivity or retransmission timers have not expired). Alternatively, for simplicity (although at the expense of some efficiency), this idle time may be coordinated with a combination the existing DRX inactivity and retransmission timers.

Another approach is for the WTRU to wait for the DRX Active Time to expire on all configured and enabled CCs to determine the retuning gap and initiate the retuning procedure. If a CC enabling or disabling trigger occurs and none of the configured CCs are operating within DRX Active Time, the retuning procedure may be immediately applied. If any of the CCs are operating within DRX Active Time, then the WTRU determination of the retuning gap is delayed until the DRX Active Time has expired on all configured CCs.

FIG. 4C is a flowchart of a method 440 for performing retuning after the DRX Active Time has expired. A CC triggering event occurs (step 442) and a determination is made whether the DRX Active Time has expired (step 444). If the DRX Active Time has not expired, then the WTRU waits until the DRX Active Time has expired. Once the DRX Active Time expires, the WTRU applies the retuning procedure (step 446).

Whether the CC enabling and/or disabling criteria is explicit activation or deactivation or DRX events (timers), the WTRU either retunes at a known retuning gap or once the DRX Active Time has expired.

With independent DRX, the Active Time needs to expire on each configured CC for the WTRU to autonomously determine the retuning gap. If, for example, CC independent DRX is employed and a new configured CC is used as an explicit trigger for enabling the CC, the WTRU autonomous retuning gap is determined by waiting for the Active Time to expire on all other CCs. Similarly, if the Active Time expiration on individual CCs is used as an implicit trigger for disabling CCs, the WTRU autonomous retuning gap is determined by waiting for the Active Time to expire on all other CCs.

If an extended period of transmission occurs, the eNB may force a retuning gap by delaying scheduling and potentially sending a MAC CE requesting the WTRU to enter DRX. In this case, the optimal choice may be to enter DRX immediately preceding the start of the next DRX On Duration period, to allow transmission to quickly resume. One alternative is for the enabling or disabling CC event to automatically force the retuning gap in advance of the next On Duration period.

The eNB may either pre-configure periodic retuning gap opportunities or may make a dynamic request for a retuning gap to occur at a certain time. Pre-configured retuning gaps are just opportunities. These periods may be used for transmission and reception if a retuning triggering event has not occurred prior to the next retuning gap opportunity or if triggering events are canceled by subsequent triggering events.

Periodic retuning gap opportunities relative to the cell system frame number (SFN) may be configured. Following a retuning triggering event, the next available retuning gap opportunity may be selected. The triggering event may be: an explicitly signaled MAC control element, a per-CC or subset of CCs independent DRX method, and/or a RRC configuration procedure that requests or informs the WTRU that it is allowed to enable and/or disable transmission and reception on one or more CCs. When a triggering event has not occurred since the last retuning gap opportunity transmission, reception is not restricted during subsequent retuning gaps. The periodic retuning gap cycles may be aligned with DRX cycle configurations.

Alternatively, the eNB may dynamically identify to the WTRU when retuning may be applied. The coordination of the exact period may be based on PHY (PDCCH) or MAC signaling. Following one of the previously described triggering events, the WTRU may wait for a retuning gap to be dynamically assigned by the eNB. If dynamic retuning gaps are utilized, the retuning period may also identified by the eNB signal enabling or disabling the CC(s).

The eNB may utilize explicit signaling to coordinate when the WTRU retuning procedure is applied. A configured periodic cycle may be configured for retuning opportunities, or aperiodic requests may be utilized to dynamically assign retuning gaps.

Known periodic cycles for retuning gaps may be known to the WTRU, where the WTRU has the opportunity to enable and/or disable CC transmission or reception. Based on retuning events, either implicitly triggered or explicitly signaled, known periodic retuning gaps may be utilized to enable and/or disable CCs. Known periodic cycles may be separately configured or implicitly aligned or associated with configured periodic DRX cycle configurations. Implicit or explicit retuning events are known to the WTRU and the eNB, so that utilization of the next periodic retuning period is known. When a retuning triggering event does not occur in advance of a known retuning gap, the normal transmission and reception operation continues during the period without performing the retuning procedure.

When the WTRU has autonomously determined a retuning triggering criteria (i.e., independent DRX), the retuning gap may be dynamically assigned by eNB signaling. A dynamically assigned retuning gap may also be coordinated with CC enabling and/or disabling triggering events, at either a known time from the triggering event or by signaling a specific retuning gap period.

One indirect method is for the eNB to idle transmissions across CCs to force one of the WTRU autonomous methods to determine a retuning gap at a time period known to the eNB. This may be accomplished by idling one or more consecutive HARQ processes which are aligned across the set of configured CCs.

For either the eNB periodically configured or the dynamically assigned retuning gap methods, ongoing HARQ process transmission and reception may be designed to skip HARQ transmission and reception opportunities. In this case, the HARQ processes will skip retransmission opportunities that are eclipsed by the eNB assigned retuning gaps. Either the transmission itself is skipped or an unsuccessful ACK is assumed for that transmission. With this method, the loss of eNB scheduling opportunities is minimized. New transmissions may be scheduled at any time other than the actual retuning gap period, because retransmission opportunities do not have to be taken into account.

While the following embodiments describe scheduling gaps based on the 3GPP LTE technology and related specifications, these embodiments are equally applicable to any multicarrier technology implementing methods to activate or deactivate CCs and/or methods for battery savings in general, such as other 3GPP technologies based on WCDMA, HSPA, HSUPA, or HSDPA.

A WTRU may be configured for multicarrier operation, e.g., with at least one SCell for a LTE Release 10 WTRU. The multicarrier operation may be scheduled using control signaling of specific characteristics during a first period, during which the WTRU can determine whether or not a second period will occur. During the second period, the WTRU is not expected to be active for a transmission on carriers that may be affected from a change in the state of the WTRU's transceiver.

In one example, a WTRU configured with at least one SCC successfully decodes at least one PDCCH on its PCell during a first period. If there is a second period for which the WTRU is not in DRX Active Time, the second period being at least as long (in subframes) as the time required for the WTRU to activate at least a first SCell of its configuration which was not active during the first period, then the WTRU may activate the first SCC such that the WTRU may transmit according to control signaling received in a third period. In this example, the first period and the third period correspond to consecutive DRX cycles, and the second period corresponds to subframes within (and close to the end of) the first period.

The existing DRX principles may be modified to allow a WTRU to turn off parts of its transceiver circuitry or to implicitly deactivate one or more CCs (e.g., one or more SCells) when possible (e.g., possibly involving a retuning of the RF front end). This is based on a set of deterministic rules, to maintain a coherent view between a network scheduler and a WTRU's behavior. A scheduler implementation may be able to create a scheduling gap, such that it may be interpreted by a WTRU as a possibility to retune its RF front end.

A baseline DRX operation for a LTE Release 10 WTRU may be that when only the PCell is active, the WTRU follows the LTE Release 8/9 DRX behavior with the corresponding DRX Active Time. While when at least one SCell is configured or activated (e.g., using RRC), all CCs of the WTRU follow a common DRX Active Time, possibly according to Release 8/9 DRX (either based on the primary DRX Active Time (PDAT) or on the sum of the DRX Active Time (DAT) on each individual CC) or a simplified version thereof, as explained above.

The DRX Active Time and/or the active state of CCs may be common for CCs within a same frequency band. This may have the benefit that DRX transitions and/or RF retuning performed for one or more CCs of a same band (i.e., of the same RF front end) may not require any scheduling gap for CCs of a different band (i.e., of a different RF front end).

In particular, if a combined RRC configuration and activation of SCells is used, the same Active Time may be applied for CCs in the same band, implying that not all CCs may follow the same Active Time for a given WTRU.

The following terms, as used herein, are defined below.

PDCCH Location: Refers to the DL CC on which the PDCCH was successfully decoded.

PDCCH Target: When cross-carrier scheduling is used, refers to the CC for which PDCCH is providing control information, e.g., the UL CC in case of a grant or the DL CC in case of an assignment.

Primary DRX Active Time (PDAT): Includes the subframes for which the WTRU is monitoring the PDCCH for assignments and/or assignments applicable to a transmission on the PCell, i.e., the PDAT corresponds to the DRX Active Time considering only the PCell. Applicable PDCCH(s) may be characterized using either a PDCCH Location being a PCell, a PDCCH Target being a PCell, or both.

Scheduling Gap: Includes the subframes for which the WTRU is either not expected or unable to transmit or receive on at least one CC. This, for example, may include at least one of the following: PDCCH monitoring for a DL assignment and/or a UL grant applicable to a transmission on the CC; physical HARQ indicator channel (PHICH) reception for one or more HARQ process(es); or PUCCH transmission, e.g., for HARQ A/N feedback for one or more HARQ process(es).

The scheduling gap (i.e., either a RF retuning (RFR) gap or a DRX state transition (ST) gap) may be specifically excluded from occurring during the DAT, i.e., subframes that are part of the scheduling gap may be explicitly excluded from the DAT.

Alternatively, the scheduling gap may be allowed to be part of the DAT. In the latter case, the WTRU is not required to monitor PDCCH during the scheduling gap even if it occurs during the DAT, similar to a measurement gap in Release 8.

The scheduling gap may be a result of a change in the set of active CCs (or SCells), e.g., as a result of "activation" and/or "deactivation" of at least one CC (or SCell), requiring the WTRU to retune the RF front end. The retuning procedure may impair WTRU transmissions for a period of time (which may be, for example, 1 ms or 2 ms) and is also referred to as a RFR gap. The activation or deactivation may be a result of an explicit signaling from the network (e.g., RRC signaling, MAC signaling, or L1/PDCCH signaling) or implicit (e.g., timer-based).

The scheduling gap may also be a result of a DRX state transition following a change in the DRX Active Time of the set of CC(s). At least one CC may be remaining in DRX Active Time, which may not require the WTRU to retune its RF front end. But this CC may require turning on or off a number of functional blocks, e.g., before (transmission) or after (reception) the RF front end, yet may impair WTRU transmissions for a period of time (which may be, for example, 1 ms or 2 ms) and is also referred to as a DRX ST gap.

The scheduling gap may thus be a fixed value (e.g., 1 ms or 2 ms), configurable by the network, derived from a WTRU capability (possibly including WTRU processing time), or derived based on whether the gap is a RFR gap or a DRX ST gap.

The "activation period" is defined as a consecutive number of subframes during which the WTRU, for at least a subset of the subframes of the activation period, monitors the PDCCH of at least one DL CC (e.g., the PCell) during a DRX Active Time for a DL assignment and/or a UL grant applicable to a transmission on any active CC. The activation period may consist entirely of subframes for which the WTRU is in DAT, e.g., when the period is equal to the DRX On Duration period, or may consist of subframes for which the WTRU is not in DAT (i.e., one or more periods of inactivity), e.g., when the period is equal to the DRX cycle. The term "applicable," when used in conjunction with a PDCCH (e.g., "a PDCCH applicable to a CC") refers to at least one of: the PDCCH Target being a UL and/or DL CC of the subgroup, the PDCCH Location being a CC of the subgroup, or both.

The activation period may be used as a set of subframes during which detection of DL assignment(s) and/or UL grant(s) applicable to a CC may result in the subsequent activation of PDCCH monitoring for DL assignment(s) and/or UL grant(s) for the same CC or a different CC. The activation period may be preceded by a scheduling gap. The activation period may also be followed by a scheduling gap (and also by one or more periods of inactivity), if the length of the activation period is different than the length of the multi-CC DRX cycle. A "period of inactivity" refers to the WTRU not being required to monitor the PDCCH for assignments and/or assignments applicable to a transmission on at least one CC, according to DRX rules.

Figure 5:
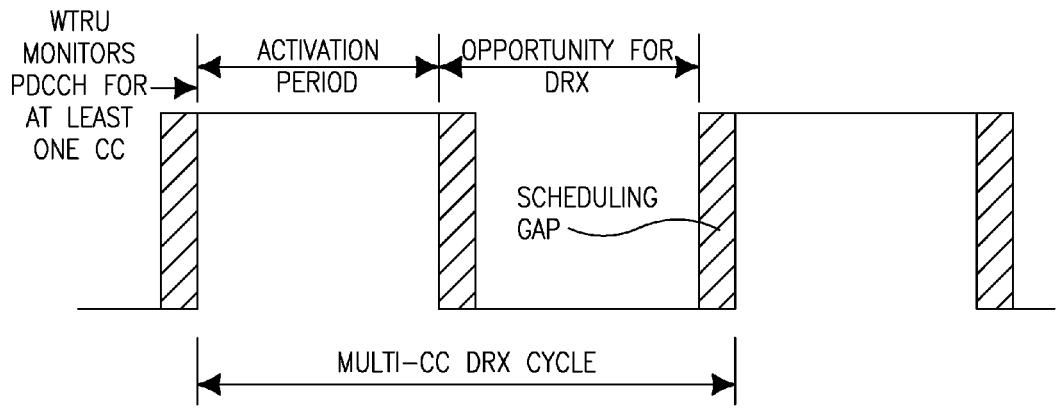
FIG. 5 is a timing diagram of a multi-CC DRX cycle.

A "multi-CC DRX cycle" is defined as a periodic repetition of the activation period, i.e., the activation period occurs once per multi-CC DRX period, as shown in FIG. 5. In an alternate embodiment, the activation period may be shorter than the PDCCH monitoring activity.

The embodiments below are described based on "activation" and "deactivation" of a CC in terms of retuning the RF front end, and consequently uses the term RFR gap. These embodiments are equally applicable to a DRX state transition which would not require retuning the RF front end (consequently the term "scheduling gap" may be used instead), or to a combination of both DRX state transition and CC activation or deactivation.

The embodiments below use at least one of the following principles: grouping of CCs, determining whether RF retuning should be performed, determining which SCC(s) should be activated, or determining the timing of the RFR gap.

With grouping of CCs, the set of CCs of the WTRU's multicarrier configuration may conceptually be separated in multiple subgroups. For example, one or more PCCs, for which the WTRU monitors the PDCCH according to the PDAT; or one or more SCCs, for which the WTRU monitors the PDCCH according to the DAT if configured and possibly also if activated. This definition does not preclude the case where all CCs are treated individually, the case where all SCCs are treated as a single subgroup, the case where SCCs of the same frequency band are treated as a subgroup, or the case where PCCs are further grouped as a PCell and SCCs are grouped as SCells.

Determining whether or not RF retuning should be performed is made during the activation period. The activation period is used to determine at least one of the following: (1) Whether or not a RFR gap is available to the WTRU at a specific point in time during the multi-CC DRX cycle (i.e., on the cycle of an activation period). (2) Whether or not a SCC (or a plurality thereof) may be active following the occurrence of the RFR gap. For example, how the WTRU may reconfigure the RF front end, i.e., which SCC (or a plurality thereof) may be activated during the RF retuning, or for what CC (or a plurality thereof) the WTRU may monitor the PDCCH after the RFR gap. (3) Whether or not the set of active CCs may be modified based on the events that occurred during the activation period.

Determining what SCC (or a plurality thereof) may be activated is made during the activation period. The activation period is used to determine whether or not a SCC (or a plurality thereof) may be activated, based on at least one of the following: (1) If the WTRU does not successfully decode any PDCCH during the activation period, then only a CC corresponding to a PCell may be active. (2) If the WTRU successfully decodes a PDCCH applicable to a PCC during the activation period, then all CCs may be active. (3) If the WTRU successfully decodes a PDCCH applicable to a SCC (or a plurality thereof) during the activation period, then the SCC (or a subgroup thereof corresponding to the SCC) may be active.

For example, if the WTRU is scheduled on at least one SCC of a SCC subgroup during the activation period, the DAT of the subgroup and the PDAT follow a common pattern during after the activation period. Otherwise, the DAT of the SCC subgroup follows a different pattern (e.g., the WTRU does not actively monitor the PDCCH for CCs of the subgroup) and/or the CCs of the subgroup are deactivated during the RFR gap.

Determining the timing of the RFR gap includes determining whether or not a RFR gap is included before the next activation period or after the current activation period.

A RFR gap immediately precedes the next activation period if at least one of the following is true. (1) The CC(s) of at least one subgroup of CC(s) is not active in the subframe corresponding to the first subframe of the activation period minus the length of the RFR gap. (2) If at least one PDCCH was successfully decoded by the WTRU during the current activation period. This may be further limited by additional qualifications, such as: if the PDCCH is applicable to a PCell, if the PDCCH is applicable to a SCell, or if the PDCCH is applicable to a SCell and if the SCell is activated.

A RFR gap immediately follows the current activation period if the WTRU determines, during the activation period, that a different set of CCs may be activated following the activation period, possibly only for the remainder of the current multi-CC DRX cycle, e.g., in case both periods differ.

Using the above principles, embodiments may be realized that define the length of the multi-CC DRX cycle, the length of the activation period, and parameters for the RFR gap. The length of the multi-CC DRX cycle is equal to the DRX cycle used by the WTRU (either the long DRX cycle or the short DRX cycle, if configured) or a configurable period of time other than the configured DRX cycle length. The length of the activation period is equal to one of: the length of the DRX On Duration, the subframes during which the WTRU is in DRX Active Time (e.g., PDAT), or the length of the multi-CC DRX cycle.

The RFR gap may be a fixed value (e.g., 1 ms or 2 ms), a value configurable by the network, or a value derived from a capability of the WTRU (possibly including WTRU processing time). The presence, and possibly also the length, of a RFR gap may be explicitly signaled to the WTRU by the network, e.g., in a MAC CE, including possibly reusing the LTE Release 8/9 DRX MAC CE or similar. The MAC CE may additionally include an indication of which subframe corresponds to the start of the RFR gap (as an offset from the reception of the MAC CE, or feedback sent for reception of a HARQ acknowledgement for the MAC CE or as an absolute value, e.g., within the DRX cycle) as well as its duration. The MAC CE may also include signaling for activation or deactivation of one or more SCCs or SCell(s).

The above principles may be used for the case where a single SCC group is defined which includes all SCCs of the WTRU configuration. These principles may also be used for the case where the CC of the PCell remains activated and follows a specified DRX pattern similar to Release 8/9 DRX, or a simplified version thereof, when at least one SCC is concurrently activated.

In the following embodiments, a number of subframes corresponding to the WTRU processing time for PDCCH signaling may additionally be inserted before the possible occurrence of a RFR gap (i.e., before or after the activation period), to allow the WTRU determine whether or not the RFR gap is needed. During those subframes, the WTRU may not consider the successfully decoded PDCCH as part of the logic to determine whether or not the RFR gap is needed.

Variations may include: using a different DRX On Duration for the PCC and for the SCC(s), where the activation period corresponds to the DRX On Duration period of the SCC(s); using PDCCH control signaling (a grant or an assignment) for a deactivated SCC as an explicit signal that the CC (or the corresponding SCell, or possibly all SCCs at once) may be activated after the end of the activation period; or the multi-CC DRX cycle being configured by upper layers (e.g., RRC), such that it is an integer multiple of the DRX cycle used by the WTRU.

For handling of the UL timing alignment, if the WTRU does not consider maintaining UL synchronization following the retuning of its RF front end (due to, e.g., a change in the set of active SCell(s)), the WTRU may additionally be required to perform a procedure to regain timing alignment.

For handling HARQ processes, scheduling requests, and the transmission of HARQ feedback; CQI, PMI, or RI; and SRS, the WTRU may additionally perform specific logic to ensure that related states remain coherent with the state of the eNB.

The WTRU may include a RFR gap in the subframe starting from the end of the multi-CC DRX cycle minus the length of the RFR gap, if the WTRU determines that not all CCs are activated in that subframe.

The WTRU may use an activation period equal to the configured and currently active multi-CC DRX cycle length, i.e., which SCC (or a plurality thereof) is needed in a subsequent multi-CC DRX cycle is determined based on the PDCCH activity of the multi-CC DRX cycle immediately preceding it.

Similarly, the WTRU may use a multi-CC DRX cycle equal to the current DRX cycle based on the WTRU configuration for the long DRX cycle and the short DRX cycle (if configured). The Release 8/9 mechanism for cycle transition may still be used, including the DRX MAC CE.

Figure 6:
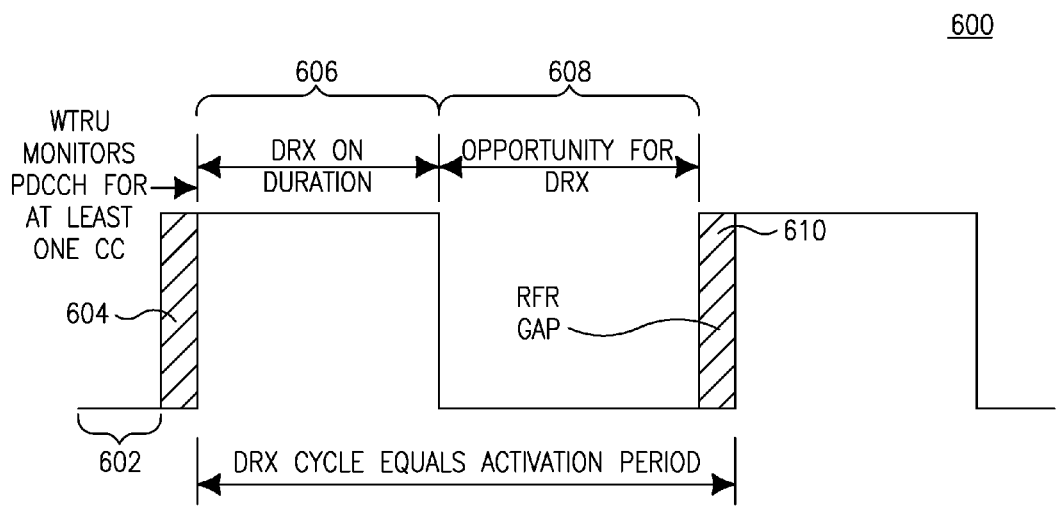
FIG. 6 is a timing diagram where the activation period has the same length as a DRX cycle.

FIG. 6 is a timing diagram 600 where the activation period has the same length as a DRX cycle. The WTRU performs at least one of the following.

Not later than at a subframe corresponding to the last subframe of the current DRX cycle minus the RFR gap length, if the WTRU determines that it may monitor a set of CCs different than the currently active set of CCs during the next DRX cycle, a RFR gap is needed. The WTRU considers the remainder of the DRX cycle (i.e., a number of subframes equal to the RFR gap length) as an opportunity to retune the RF front end and/or to change the activation state of the SCCs (step 602).

In the subframes corresponding to the RFR gap (if needed from the previous step), the WTRU reconfigures the RF front end and/or activates SCCs according to at least one of the criteria used for activating the SCC (step 604).

The WTRU starts a new DRX cycle. In the subframes of the DRX cycle, excluding the subframes that are part of a RFR gap, the WTRU monitors the PDCCH applicable to all configured or activated CCs during the DAT, possibly in common with the PDAT (steps 606, 608).

The WTRU determines whether or not at least one PDCCH applicable to any CC (i.e., for a PCell or any SCell) was successfully decoded in any subframe of the period. The WTRU determines that a RFR gap is not needed if there is no need to perform retuning of the RF front end and/or to change the activation state of the SCCs. For example, if no PDCCH was successfully decoded and none of the SCCs are activated for the current DRX cycle, or at least one PDCCH was successfully decoded and all of the configured SCCs are activated for the current DRX cycle.

The WTRU may also determine whether or not none of the successfully decoded PDCCHs are applicable to a SCC (i.e., only the PDCCHs applicable to a PCell is received) during the DRX cycle.

The WTRU may also determine whether or not at least one PDCCH applicable for a SCC (in particular, a CC being a PDCCH Target) was successfully decoded in any subframe of the DRX cycle. The WTRU determines that a RFR gap is not needed if there is no need to perform retuning of the RF front end and/or to change the activation state of the SCCs. For example, if no PDCCH was successfully decoded and none of the SCCs are activated for the current DRX cycle, or at least one PDCCH was successfully decoded, but all PDCCHs only apply the configured SCC(s) that are activated for the current DRX cycle.

The WTRU may also additionally determine for which SCC (or a plurality thereof, possibly a subgroup of SCCs) the PDCCH is applicable to. In this case, only the SCCs corresponding to the subgroup(s) will remain active for the remainder of the current DRX cycle.

The WTRU determines whether or not a RFR gap is needed based on at least one of the following. If no PDCCH was successfully decoded, only the CCs corresponding to a PCell are needed for the next DRX cycle. A RFR gap is needed only if at least one SCC is active for the current DRX cycle, if none of the successfully decoded PDCCHs are applicable to any of the SCCs corresponding to a SCell, or if the PDCCH indicates a new transmission.

If at least one PDCCH applicable to a SCell was successfully decoded, a RFR gap is needed only if the SCC(s) active for the current DRX cycle differ than the SCC(s) which should be active for next DRX cycle, possibly considering only PDCCHs indicating a new transmission.

In the subframes preceding the start of the next DRX cycle (the number of subframes being equal to the number of subframes of a RFR gap), if the WTRU previously determined that a RFR gap is needed, the WTRU reconfigures the RF front end and/or activates SCCs (step 610). The reconfiguring of the RF front end or activating SCCs is based on criteria for whether or not the activation state of a CC may be modified. The WTRU may reconfigure the RF front end and/or: deactivate all SCCs, activate all SCCs, or deactivate only the SCCs (or subgroups thereof) for which no applicable PDCCH was successfully decoded during the DRX On Duration.

During the entire DRX cycle, the WTRU applies the same DRX Active Time for all CC(s) (e.g., the PDAT) for which it monitors for a PDCCH applicable for a transmission on the CC(s), e.g., all activated CCs. The WTRU does not need to monitor the PDCCH for other CCs (e.g., conceptually, either a different DRX Active Time than the PDAT is used or, alternatively, the CC is considered deactivated and is not subject to the DAT), which may additionally have been deactivated during the previous RFR gap.

The WTRU may include a RFR gap after the activation period if the WTRU determines during the activation period that a different set of CCs for which the PDCCH may be received may be used during the remainder of the multi-CC DRX cycle. Alternatively, the WTRU may include a RFR gap in the subframe starting from the end of the multi-CC DRX cycle minus the length of the RFR gap, if the WTRU determines that not all CCs are activated in that subframe.

The WTRU may use an activation period equal to the configured DRX On Duration period, i.e., the starting point of the respective periods and their length are equal. Similarly, the WTRU may use a multi-CC DRX cycle equal to the current DRX cycle based on the WTRU's configuration for the long DRX cycle and the short DRX cycle (if configured). The Release 8/9 mechanism for cycle transition may still be used, including the DRX MAC CE.

Figure 7:
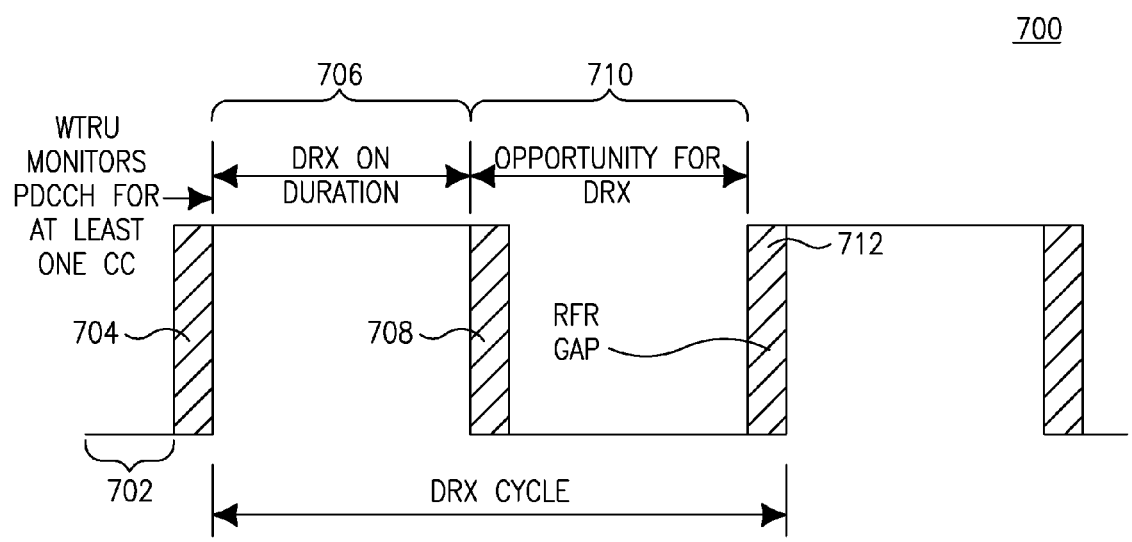
FIG. 7 is a timing diagram where the activation period has the same length as the DRX On Duration.

FIG. 7 is a timing diagram 700 where the activation period has the same length as the DRX On Duration. The WTRU performs at least one of the following.

For a subframe corresponding to the last subframe of the current DRX cycle minus the RFR gap length, if the WTRU determines that the number of active SCCs in the subframe is less than the total number of configured SCCs, a RFR gap is needed. The WTRU considers the remainder of the DRX cycle (i.e., a number of subframes equal to the RFR gap length) as an opportunity to perform retuning of the RF front end and/or to change the activation state of the SCCs (step 702).

In the subframes corresponding to the RFR gap (if needed from the previous step), the WTRU reconfigures the RF front end and/or activates all of the SCCs (step 704).

The WTRU starts a new DRX cycle. In the subframes corresponding to the On Duration period (i.e., while the DRX On Duration timer is running) the WTRU monitors the PDCCH applicable to all configured CCs (step 706).

The WTRU determines whether or not at least one PDCCH applicable to any CC (i.e., for a PCell or any SCell) was successfully decoded in any subframes of the period, in which case the WTRU determines that a RFR gap is not needed.

The WTRU determines whether or not none of the successfully decoded PDCCH are applicable to a SCC (i.e., only the PDCCH applicable to a PCell is received) during the period.

The WTRU determines whether or not at least one PDCCH applicable for a SCC was successfully decoded in any subframe of the period, in which case the WTRU determines that a RFR gap is needed.

The WTRU may also determine for which SCC (possibly which subgroup of SCCs) the PDCCH is applicable to, in which case only the SCCs corresponding to the subgroup(s) will remain active for the remainder of the current DRX cycle.

The WTRU determines whether or not a RFR gap is needed based on at least one of the following. If no PDCCH was successfully decoded, only the CCs corresponding to a PCell are needed for the remainder of the DRX cycle and a RFR gap is needed. A RFR gap may also be needed if none of the successfully decoded PDCCHs are applicable to any of the SCCs corresponding to a SCell or if the PDCCH indicates a new transmission.

A RFR gap may not be needed if at least one PDCCH applicable to a SCell was successfully decoded or if the PDCCH indicates a new transmission. But, a RFR gap may be needed in the case where the WTRU may reconfigure the RF front end and/or may deactivate one or more SCCs (or subgroups thereof) for which none of the successfully decoded PDCCHs were applicable, such that the resulting number of active SCCs used for the remainder of the DRX cycle will be less than the number of active CCs during the On Duration period.

Starting from the first subframe after the end of the DRX On Duration period, if the WTRU previously determined that a RFR gap is needed, the WTRU reconfigures the RF front end and/or activates SCCs (step 708). The WTRU may reconfigure the RF front end and/or: deactivate all SCCs or deactivate only the SCCs (or subgroups thereof) for which no applicable PDCCH was successfully decoded during the DRX On Duration.

During the remainder of the DRX cycle, i.e., following the end of the DRX On Duration, the WTRU applies the same DRX Active Time for all CC(s) (e.g., the PDAT) for which it monitors for a PDCCH applicable for a transmission on the CC(s), e.g., all activated CCs (step 710). The WTRU does not need to monitor the PDCCH for other CCs (e.g., a different DRX Active Time than the PDAT is used), which may additionally have been deactivated during the previous RFR gap. In addition, the WTRU performs step 702 above.

During the RFR gap at the end of the DRX cycle, the WTRU reconfigures the RF front end and/or activates all of the SCCs (step 712).

Conceptually, some of the alternatives above may also be viewed as PCCs following a first DRX Active Time (e.g., the PDAT which may follow Release 8/9 DRX rules), while SCCs follow a second DRX Active Time (e.g., a SDAT). During the DRX On Duration period, the SDAT for all SCCs is the same as the PDAT. If the WTRU determines that at least one SCC has not been scheduled, the SDAT of (possibly all) the WTRU may inactivate the SCC(s) (i.e., enter a DRX sleep or deactivate state) after the occurrence of a gap during which the WTRU does not expect to be scheduled. When the DRX cycle is close to ending, the WTRU inserts a similar gap in the DRX pattern if the WTRU had determined during the DRX On Duration that at least one SCC should not follow the PDAT for this cycle.

The WTRU may perform required measurements for configured SCells during the activation period according to specified measurement requirements. Such measurements may be either CQI measurements (if configured, such as, e.g., A1/A2 threshold-based measurements on SCells) or measurements configured by RRC, such that the WTRU may report for SCells independently of whether or not the configured SCell(s) are active for the entire multi-CC DRX cycle.

The presence of a scheduling gap may be due to either WTRU implementation or a synchronized method. When based on WTRU implementation, the WTRU autonomously determines when the scheduling gap occurs, in which case the timing of the gap is not known to the eNB scheduler. Based on this, there may be ongoing HARQ processes during a scheduling gap which need to be handled, because there are not supposed to be any ongoing transmissions during the scheduling gap.

When based on a synchronized method, the scheduling gap may be scheduled by explicit signaling from the eNB or by an implicit method. A first implicit method is based on timers or a configured start offset and periodicity (the methods described above would fall in this category). A second implicit method is based on the HARQ process state, e.g., a gap may be scheduled once all HARQ processes have completed.

In any of the cases above, if a gap occurs during an ongoing transmission, the HARQ processes should not reach a state that is no longer coherent with the state of the eNB for the same HARQ process(es).

The WTRU may handle the HARQ processes for a subframe that is part of a required scheduling gap in a similar manner as for a measurement gap. This also applies to handling of scheduling request, and the transmission of HARQ feedback; CQI, PMI, or RI; and SRS.

When the WTRU initiates a random access procedure and the WTRU is required to use a scheduling gap, the WTRU may perform at least one of the following procedures to handle the random access procedure when it collides with the scheduling gap.

The WTRU may delay transmission of the preamble, if a subframe that is part of the scheduling coincides with the subframe that the WTRU may have used for the preamble transmission. For example, if the colliding subframe corresponds to the next available subframe containing the PRACH permitted by the restrictions given by the prach-Config Index, the PRACH Mask Index, and physical layer timing requirements (similar to a collision with a measurement gap), the WTRU may delay transmission of the preamble.

If a random access preamble has already been transmitted prior to the occurrence of a scheduling gap, the WTRU may: extend the length of the RA response window, e.g., by an amount at least equal to the length of the scheduling gap; ignore the scheduling gap, such that the WTRU does not perform the related actions, e.g., the RF front end retuning and/or the DRX transition(s); or determine that the random access procedure is unsuccessful.

If the WTRU has received a UL grant in the RAR for a subframe that collides with a required scheduling gap, the WTRU may ignore the scheduling gap, such that the WTRU does not perform the related actions, e.g., the RF front end retuning and/or the DRX transition(s). Alternatively, the WTRU may ignore the received grant and declare the random access procedure unsuccessful.

If Msg3 has already been transmitted, and if a scheduling gap occurs while the contention resolution timer is running, the WTRU may exclude the subframe(s) that are part of the gap from the contention resolution period; i.e., the timer is not updated for those subframes. Alternatively, the WTRU may ignore the scheduling gap, such that the WTRU does not perform the related actions, e.g., the RF front end retuning and/or the DRX transition(s).

The WTRU may perform a procedure to regain UL timing alignment after it has performed RF front end retuning caused by, e.g., some event that triggered a change in the set of active SCell(s). This procedure may include any of the following.

The WTRU may consider the TAT as expired and perform related actions, e.g., removal of configured dedicated UL resources, when performing the RF front end retuning. The WTRU may not necessarily remove some or all of the dedicated resources (e.g., SRS, CQI).

The WTRU may transmit a dedicated preamble at the first possible occasion after it has completed the retuning of its RF front end. Only a preamble is transmitted in this case, which allows the eNB to transmit a Timing Advance command (TAC) back to the WTRU using a dedicated transmission on the DL SCH, which then applies the received timing adjustment. The eNB may derive the identity of the WTRU from the received dedicated preamble which it previously had assigned to the WTRU.

The WTRU may resume transmission of SRS on its configured (i.e., dedicated) SRS resources. The SRS transmission may then be used by the eNB to determine the timing adjustment required for the WTRU. Alternatively, the WTRU may resume transmission of CQI on its configured (i.e., dedicated) CQI resources. The CQI transmission may then be used by the eNB to determine the timing adjustment required for the WTRU.

The WTRU may initiate a RACH procedure, either contention free random access (CFRA) or contention based random access (CBRA). The WTRU may also perform any other procedure that requires a RACH procedure.

Any of the above procedures may be combined with the additional requirement that the WTRU is not allowed perform any UL transmission (other than any transmission(s) required for the above synchronization procedure) either until a TAC and/or RA Msg2 is received (i.e., completion of the synchronization procedure) or until the WTRU successfully decodes the PDCCH to its C-RNTI (possibly only for a DCI indicating a UL grant).

Alternatively, the eNB may rely on UL transmissions from the WTRU based on normal operation, and issue a TAC to the WTRU if needed.

For LTE Release 8/9, once a WTRU has acquired DL timing using the primary and secondary synchronization channels, the WTRU should be able to synchronize every subframe with the DL timing, such that WTRU oscillator drift is not an issue after the RF is tuned to a cell. This may also apply to multiple cells sharing the same TA.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for scheduling a time when a retuning gap occurs by a wireless transmit/receive unit (WTRU), comprising:
    detecting a retuning triggering event, wherein the retriggering event is based on a secondary component carrier activation or deactivation;
    determining a period of time when a retuning gap occurs, on a condition that the triggering event is detected, wherein the retuning gap is a time period in which the WTRU is capable of retuning its radio frequency front end to currently active component carriers; and
    performing radio frequency front end retuning during the retuning gap.

2. The method according to claim 1, wherein the retuning triggering event is further based on an explicit signal received by the WTRU.

3. The method according to claim 2, wherein the explicit signal received by the WTRU includes a signal received from an evolved Node B that is associated with a component carrier activation or deactivation.

4. The method according to claim 1, wherein the determining of the retuning gap period is based on uplink transmissions or downlink transmissions.

5. The method according to claim 4, wherein the transmissions are based on any one of: a physical downlink control channel reception, uplink hybrid automatic repeat request (HARQ) feedback, or downlink HARQ feedback.

6. The method according to claim 5, further comprising:
    determining an idle period having a length that is greater than or equal to the retuning gap length.

7. The method according to claim 1, wherein:
    the determining of the retuning gap period is based on a status of hybrid automatic repeat request (HARQ) process transmissions; and
    the retuning gap is determined once all uplink and downlink HARQ processes are idle, wherein the HARQ processes are idle on a condition that: the WTRU generates a HARQ acknowledgement, the WTRU receives a HARQ acknowledgement, or a maximum number of transmissions is reached for all HARQ processes.

8. The method according to claim 1, wherein the determining of the retuning gap period is based on detecting an idle period from an end of a prior active transmission or retransmission on all active component carriers.

9. The method according to claim 8, wherein the retuning gap period is determined on a condition that the detected idle period has a length that is greater than or equal to the retuning gap length.

10. The method according to claim 1, wherein the determining of the retuning gap period is based on discontinuous reception (DRX) cycles.

11. The method according to claim 10, wherein:
    a retuning gap is determined on a condition that all active component carriers are not within DRX Active Time; and
    on a condition that a length of time until the next DRX On Duration period is greater than or equal to the retuning gap length.

12. The method according to claim 11, wherein the determined retuning gap is applied on a condition that all activated component carriers are no longer within DRX Active Time or within the required retuning gap period in advance of a next DRX On Duration period or a next DRX cycle.

13. A method performed by a wireless transmit/receive unit (WTRU) during an activation period, comprising:
    monitoring a physical downlink control channel (PDCCH) of at least one downlink (DL) component carrier (CC) for channel assignments for any CC from a set of active CCs;
    determining whether a radio frequency retuning (RFR) gap is available to the WTRU during a multi-CC discontinuous reception (DRX) cycle;
    on a condition that CCs of at least one subgroup of CCs are not active in a first subframe of the activation period minus a duration of the RFR gap, scheduling the RFR gap to precede a next activation period;
    on a condition that at least one PDCCH was successfully decoded by the WTRU during the activation period, scheduling the RFR gap to precede the next activation period; and
    on a condition that a different set of CCs may be activated following the activation period, scheduling the RFR gap to follow the activation period.

14. The method according to claim 13, wherein on a condition that the WTRU successfully decodes a PDCCH applicable to at least one secondary component carrier (SCC), activating the at least one SCC following the RFR gap.

15. The method according to claim 13, wherein a duration of the multi-CC DRX cycle is equal to a duration of a DRX cycle used by the WTRU.

16. The method according to claim 13, wherein a duration of the multi-CC DRX cycle is a configurable DRX cycle length.

17. The method according to claim 13, wherein a duration of the activation period is any one of: a DRX On Duration, a duration of a primary DRX Active Time, or the duration of the multi-CC DRX cycle.

18. The method according to claim 13, wherein the duration of the RFR gap is any one of: a fixed value, configurable by a network, or derived from a capability of the WTRU.

19. The method according to claim 13, wherein the channel assignments include at least one of a DL assignment or an uplink grant.

* * * * *